United States Patent [19]

Heckelman et al.

[11] 4,414,669
[45] Nov. 8, 1983

[54] SELF-TESTING PIPELINE PROCESSORS

[75] Inventors: Richard W. Heckelman, Skaneateles; Christopher E. Marchant, Baldwinsville; Jack B. Williams, Liverpool, all of N.Y.

[73] Assignee: General Electric Company, Syracuse, N.Y.

[21] Appl. No.: 286,210

[22] Filed: Jul. 23, 1981

[51] Int. Cl.³ .............................................. G06F 11/10
[52] U.S. Cl. ....................................... 371/49; 364/200
[58] Field of Search ..................... 371/49, 50, 15, 16, 371/48, 71; 364/200 MS File, 900 MS File

[56] References Cited

U.S. PATENT DOCUMENTS

| 3,763,470 | 10/1973 | Geng et al. | 371/49 |
| 3,911,261 | 10/1975 | Taylor | 371/49 |
| 4,079,456 | 3/1978 | Lunsford et al. | 364/200 |
| 4,092,522 | 5/1978 | Miller | 371/49 |
| 4,224,681 | 9/1980 | Lewine | 371/49 |
| 4,253,183 | 2/1981 | Taylor et al. | 364/200 |
| 4,304,002 | 12/1981 | Hunt | 371/50 |
| 4,305,124 | 12/1981 | Marro et al. | 364/200 |

Primary Examiner—Mark E. Nusbaum
Assistant Examiner—Gary V. Harkcom
Attorney, Agent, or Firm—Richard V. Lang; Carl W. Baker

[57] ABSTRACT

The present invention relates to pipeline processors having testing means for identifying malfunctioning modules and for testing the self-testing means themselves. The testing employs the parity check principle and provides an on-line test of memory modules and an off-line test at the processor clock rate of both memory and arithmetic modules. The means for testing include a parity encoder associated with each module and a comparator which couples parity "comparison values" to a priority encoder, operating at the high speed clock rate of the pipeline processor. The test results are then supplied to a RAM, also operating at the clock rate of the pipeline processor. With the test results in the memory, a microcomputer is provided to search the memory at a slower rate for the highest priority failed module. Means are also provided for parity checking the testing means such as the test vector generator, as well as the pipeline processor 10 Claims, 6 Drawing Figures

FIG. 2

FIG. 3A PARITY BIT SELECTION AND PLACEMENT IN 8 BIT BYTE'S

SELF-TESTING PIPELINE PROCESSORS

BACKGROUND OF THE INVENTION

1. Field of the Invention

The present invention relates to pipeline processors and in particular to such processors having self-testing means for identifying malfunctioning modules therein.

2. Description of the Prior Art

Advances in integrated circuit technology have led to the practical implementation of increasingly sophisticated pipeline processors comprising large numbers of individual circuit modules. Maintaining the processors in operable condition has become a complex task because of the difficulty of identifying malfunctioning modules.

Prior art self-test means for pipeline processors have been proposed which apply to the input of a processor a series of pre-designed, multibit test vectors designed to cause each of the modules therein to produce a series of predetermined, multibit output data. If the series of multibit output data actually produced by the individual modules in response to the applied test vectors are examined, at test points connected to the outputs of the modules, it can be determined whether any module is malfunctioning. In the case of large processors with many modules, however, it is impractical to provide the great number of test points that would be required to implement the above-described examination of outputs.

One prior art self-test system which has been established for testing such large processors (see Benowitz et al, "An Advanced Fault Isolation System for Digital Logic", IEEE Transactions on Computers, May 1975) provides for the inclusion of self-test circuitry in each module. This overcomes the difficulty of providing many test points on a relatively small integrated circuit, but the self-test circuitry added to each module comprises substantial hardware, including parity encoders, an adder, a storage register and a comparator. Not only does this hardware substantially increase the total cost and size of the processor, but the multistep test procedure performed by the self-test circuitry on each module during the application of each test vector to the pipeline processor prevents processing of the test vectors at the full operating speed of the processor. Testing at such a reduced speed decreases the likelihood of detecting intermittent failures caused by inadequate timing margins. In addition to the above-mentioned drawbacks, no means is provided for automatically identifying malfunctioning modules. Rather, the self-test circuitry in each module merely indicates when the module is producing erroneous outputs. Such erroneous outputs can be caused not only by malfunctioning of the module itself, but also by malfunctioning of a more upstream module in the flow of data through the processor.

In another system, a parity encoder is included in selected modules of a processor to provide the parity of output data produced by the module. Parity is the module-two sum of the one-valued bits in a binary-coded word. In accordance with this definition, parity is one-valued if and only if the number of one-valued bits is odd. Parity codes are used in the above system and in the present system to detect faulty modules by performing one of two different types of testing (hereinafter referred to as true-parity testing and parity scan testing) on individual modules. The type of test performed on an individual module depends on the function of the circuitry included in the module.

True parity testing is performed on those modules whose circuitry passes data therethrough with parity unchanged or if changed, does so in a manner by which the parity is deducible from the input data. Such modules are called "deducible parity modules" (dpm). Examples of dpm modules which pass data without parity change include the functions of data transfer, multiplexing, and memory. Examples of "dpm" modules, which pass parity data with a deducible change, include the functions of one's complementing (deducible when the number of bits of the data is known) and the formation of a modulo-two sum. The parity of output data produced by each of these dpm modules is derived by the parity encoder on the module and is compared with the parity of the module's input data from which the output data originated. The latter parity values are propagated through the modules alone with input data applied to the module. Whenever a parity error occurs in the output data produced by a dpm module, an associated comparator produces an error signal. The single test point on each module is connected to a flip-flop which is one-valued in the absence of an error and which is set to zero whenever an error signal is received from the module. The collector of the test-point flip flop values is sequentially interrogated under minicomputer control to detect any faulty modules. An address vector, locating each faulty module detected during interrogation, is produced by the test circuitry.

Parity scan testing is performed on modules that transform data in a manner by which the output parity is not deducible from the input parity. "Non-deducible parity modules" exclude the deducible parity modules mentioned above but include most other digital functions. Non-deducible parity modules include circuitry such as arithmetic logic units, multipliers, and fast Fourier transformers. The parities of the output data produced by these modules can be determined only if the input data and the module functions are known. Thus, for these modules the parity of the input is not useful. However, the parity value of output data produced by each module's parity encoder is provided at a single test point on the module. These modules are tested by applying a sequence of predefined test vectors to the input of the pipeline processor and monitoring the resulting parity values produced in the test points of the individual modules. The sequence of error-free parity values that should be produced by each module, during application of the sequence of test vectors, is predetermined (analytically or experimentally) and stored in a memory. One module at a time is tested by minicomputer controlled circuitry which first stores the series of parity values actually produced by the module and then successively transmits them to the minicomputer for comparison with the predetermined error-free parity value. If the transmitted and predetermined parity codes for the module are not identical, thus indicating that the module is faulty, the minicomputer produces an address locating the module being tested.

SUMMARY OF THE INVENTION

Accordingly, it is an object of the present invention to provide a self-testing pipeline processor using improved parity checking techniques.

It is another object to provide a self-testing pipeline processor in which parity checking may be accomplished at the full processor clocking rate.

It is still another object to provide a self-testing pipeline processor in which isolation of a failed module is achieved with minimum added hardware for any module function.

It is a further object to provide an improved self-testing apparatus which accommodates the pipelines of differing numbers of modules, differing channel widths (data path bits) and different input to output delays.

It is still another object of the present invention to provide an improved self-testing apparatus in which self-testing and self-diagnosing can be effected by a controller, which can stand alone and which has little need for test software development.

These and other objects of the invention are achieved in a novel self-testing pipeline processor. The processor comprises a plurality of concatenated deducible parity (DP) and non-deducible parity (NDP) modules, a priority encoder, a memory for storing test results acquired in the test procedure, a microcomputer for searching that memory, and a memory for providing suitable test vectors. Each module of the processor processes data at a given, normally high speed (5 MHz) clock rate. Each DP module includes a parity encoder to which the module output data is applied for parity encoding and a comparator to which the input parity propagated in the module and the parity of the module output data are applied. The comparator forms comparison values at the clock rate, each non-comparison being indicative of a possible fault in a module.

Each non-deducible parity (NDP) module has an input for data and an output for data, and each NDP module propagates the data to the output in performing a predetermined function on the data. Each NDP module includes a parity encoder to which the module output data is applied for parity encoding. In addition, each NDP module employs a comparator, normally a part of the central controller, to which expected expected parity and the parity of the module output data are applied to form comparison values, also at the clock rate. As before, non-comparisons are indicative of a possible fault in the NDP modules.

The central controller includes a source of test data, test vectors, a priority encoder, a memory for storing test results. The test vectors derived from storage are coupled to the data input of the initial module of the processor at the clock rate, the test data being designed to cause each DP and NDP module to produce output data having known parities, the test data being chosen so as to ensure a satisfactory probability of any malfunctioning module producing output data with erroneous parity. The parity of the test data expected at each NDP module output is supplied to one input of the associated comparator.

The priority encoder has a plurality of priority ordered inputs and produces a malfunction code at the clock rate identifying the highest priority input at which each non-comparison is produced, the priority encoder input being connected to the comparator outputs in the order of the associated modules' positions in the processor, with the DP associated comparators being prior to all NDP associated comparators.

The memory means is coupled to the priority encoder for storing the malfunction codes at the clock rate to identify the highest priority module associated with each error as a quantity of test data is processed.

The central controller also includes a microprocessor which conducts a search through the test data in the memory for the highest priority module associated with an error.

In accordance with another facet of the invention, the test vectors are stored in lower speed, electrically programmable ROMs, and transferred via high speed RAMs to suitably high speed (5 MHz) registers where the test vectors may be introduced into the pipeline processor at its designed clock rate. The use of EPROMs permits easy modification of the processor and of the test data. The elements processing the test vectors are also subject to parity test.

BRIEF DESCRIPTION OF THE DRAWINGS

The novel and distinctive features of the invention are set forth in the claims appended to the present application. The invention itself, however, together with further objects and advantages thereof may best be understood by reference to the following description and accompanying drawings in which:

FIGS. 3A and 3B illustrate the application of parity checking to the storage and retrieval of the test vectors and expected parity scan values used in a self-testing pipeline processor.

DESCRIPTION OF THE PREFERRED EMBODIMENT

Figures 1, 1A:
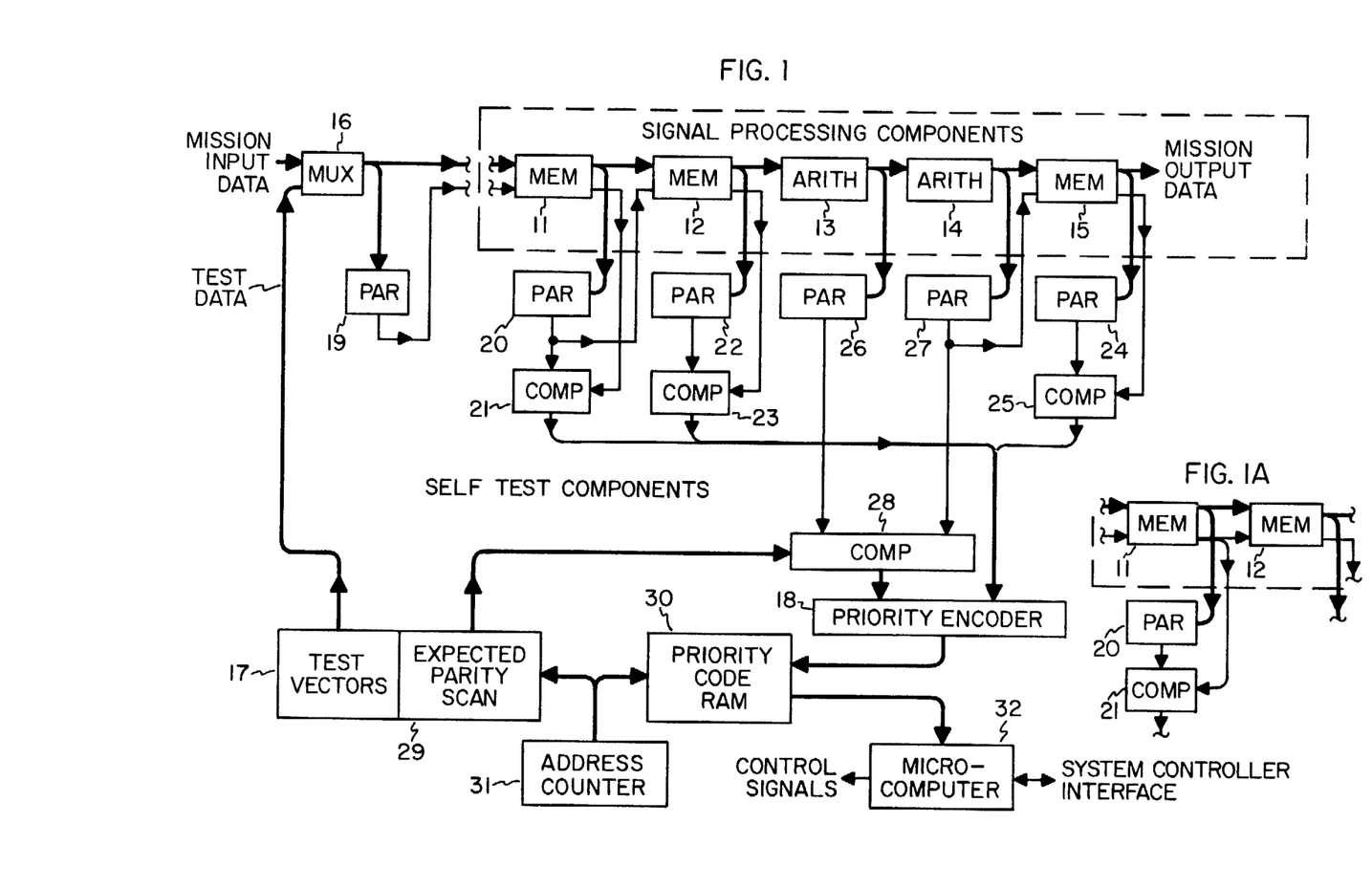
FIG. 1 is a simplified block diagram of a self-testing pipeline processor.
FIG. 1A is an alternative mode of interconnection between memory modules.

In accordance with the invention, a self-testing pipeline processor is illustrated in FIG. 1 comprising a succession of conventional data processing components bearing reference numerals 11–15 arranged above and to the right of the dotted line in FIG. 1, and the novel self-test components bearing reference numerals 16 to 32 occupying the balance of the figure. For ease in understanding, the illustration has been simplified.

The pipeline processor comprises an "N" numbered succession of concatenated digital modules bearing reference numerals 11, 12, 13, 14 and 15, each having a bit-parallel word-serial input and a bit-parallel word-serial output. In an exemplary application, the "mission" input data to the processor are input-data vectors that may consist of pairs of twelve-bit words for a 24 bit input. Certain modules, typically those marked memory (reference numerals 11, 12, and 15), may be expected to retain the same bit format from input to output. As the term has been defined in the introduction, the memory modules 11, 12 and 15 are deducible parity modules and the arithmetic modules 13, 14 are non-deducible parity modules.

The self-testing capability of the processor is provided by the remaining components 16 to 32. Self-testing of the pipeline processor is achieved module by module with self-test components associated with each module, a multiplexer to which test data is applied, and a central controller. The memory modules each have associated parity encoders and parity comparators for deducible (true) parity-error detection. The arithmetic modules have associated parity-scan encoders producing parity error detection through comparison against stored pre-computed parity values for a specified test-input sequence. Simple parity checking will only detect failures which result in an odd number of bit errors. The probability of detecting errors increases as the number of patterns increases.

As will be detailed, the self-testing is in two stages; on-line testing of the pipeline processor, which is a true parity test of the memory modules only, and off-line testing which is a true parity test of the memory modules and a parity-scan test of the arithmetic modules, both using a test-input sequence. The functions of the controller include response to the occurrence of an on-line parity error in the memory modules to institute memory-fault isolation. Off-line testing is initiated when a test command is received. The off-line test sequence is controlled by an address counter that, for the 64-module pipeline processor in the example, has a 1024 counts ($2^{10}$), that are then used as addresses in the generation of off-line test signals; in the obtaining of reference parity-scan values; and in the sequences of the memory (RAM) used to capture encoded error information.

Once errors are detected, the central controller is used to locate the fault(s). A memory error unambiguously locates the faulty memory module which has signaled the error. In the present practical embodiment, that capability is not utilized in favor of using the priority encoder to identify failed modules. Errors detected in the parity scan test may provide an ambiguous indication of the fault location, since cumulative errors are produced downstream of the faulty module. The microcomputer conducts a search through the error data provided by a large number of test values to find the first faulty module. The test vectors must be of sufficient number to unambiguously determine any first faulty module. The faulty module should then be replaced, and the test re-initiated to determine whether a second faulty module is present. The test and substitution procedure continues until the tests show the absence of errors in the test scan, and by inference, a freedom from fault in the pipeline processor. As will be seen, the test controller also tests itself.

The elements of the self-testing system and their operation will now be detailed with reference to FIG. 1, which is a simplified drawing of a practical self-testing pipeline processor.

A multiplexer (MUX) 16 has been provided having a selectable first input for mission data and an alternate, second input for test data derived from test vector memory 17 (a read only memory), and a single output coupled to the data path leading to the input of the memory module 11 of the pipeline processor.

During normal operation, (with concurrent on-line testing) mission data to be processed is applied to the first input of the MUX 16 as a sequence of 24-bit vectors. During off-line testing, test data are applied to the second input of the MUX as a sequence of 24-bit vectors from the ROM 17. The MUX connects the second input to the data path leading to module 11 when an off-line signal is applied to a control input thereof, and connects the first input to that data path at all other times.

The deducible parity modules, namely the memory modules 11, 12 and 15, each have a first input for data (either mission or test) and a second input for parity data. Associated with each memory module is a true-parity error sensing means, which functions both during the on-line operation and off-line testing of the processor and which couples the parity comparison value (or parity error) to a priority encoder 18. The input parity for the memory module 11 is derived by the parity encoder 19 from the output of a prior module, if one is present. If the memory module 11 is the first module, the parity encoder 19 is coupled to the output of the MUX 16. Associated with the memory module 11 are the parity encoder 20 and the comparator 21. Similarly, the memory module 12 has an associated encoder 22 and a comparator 23, and the memory module 15 has an associated encoder 24 and a comparator 25.

The parity applied at each memory module input is propagated through the module and is compared against the parity obtained by encoding the module output in the associated encoder, thereby checking the module. A parity difference (non-compare) generates a parity-error signal that is supplied to the priority encoder 18. The elements for performing the true-parity error checking have been identified above. The mission input data and the parity input data are loaded in parallel into the memory 11. When the two data are read out, they appear in parallel. The parity output data of the module 11 is coupled to one input of the associated comparator 21. The mission output data of the module 11 is coupled to the parity encoder 20 which provides a second input to the comparator 21. The parity encoded output data from module 11 is also available for application to the succeeding memory module 12. (If the succeeding module is not a memory module, the parity data is not coupled thereto.) The parity comparison value from 21 is then supplied to the priority encoder 18. Typically, both the parity encoder 20 and the comparator 21 are made a part of the memory module 11.

The succeeding memory module 12 has the following connections to the prior and succeeding modules, and to the associated parity encoder 22 and to the associated comparator 23. The data input of module 12 is connected to the corresponding output of the prior module 11, and the data output of module 12 is connected to the corresponding input of the succeeding module 13. The parity input of module 12, as earlier noted, is connected to the output of the parity encoder 20 associated with module 11, and which parity encodes the output of module 11. The comparator 23 associated with module 12 has one input coupled to the parity output of the memory module 12. The output data of the memory module 12 is coupled to the associated parity encoder 22 and that parity value is supplied to a second input of the comparator 23. The parity comparison value (or error) from the comparator 23 is then supplied to a second input of the priority encoder 18.

The memory module 15 has the following connections. The data input of module 15 is connected to the corresponding output of the prior module 14, and the output data from the processor is derived at the output of module 15. The parity input to module 15 is obtained from the output of the parity encoder 27 associated with the preceding module 14 and which parity encodes the output of module 14. The parity output of module 15 is connected to one input of the comparator 25. The output data of the memory module 15 is coupled to the associated parity encoder 24, and that parity value is supplied to a second input of the comparator 25. The parity comparison value (error signal) from comparator 25 is then applied to the corresponding true parity input of the priority encoder 18.

The arithmetic modules 13 and 14 are tested "off line" by checking the module outputs against expected outputs using known inputs. This process is the parity-scan process, and it produces parity-scan comparison values or parity-scan error signals that are arranged in sequence in the priority encoder 18. As earlier noted, the memory modules are also tested in the parity-scan process. Pre-selected 24-bit vector inputs are supplied from the test-vector memory 17 and coupled to the test data input of the multiplexer 16. When the multiplexer 16 is controlled to be in the "off-line" state, the test vectors are coupled to the pipeline processor data path leading to the input of the module 11. The test vectors are then transferred successively through the memory module 12 to the input of the arithmetic module 13.

The arithmetic module 13 has the following connection. The module's data input is coupled to the output of the memory module 12 and the module's data output is coupled to the data input of the succeeding arithmetic module 14. The arithmetic module 13 has an associated parity encoder 26 to which data output is supplied. The module 13 has no parity input connection, and the parity output derived from parity encoder 26 is not supplied to the following arithmetic module. The encoded parity scan value from encoder 26 is supplied to one input of the comparator 28, a device which, as will be seen, accepts parity scan values from all airthmetic modules.

The comparator 28 has a second input coupled to the output of the expected parity scan results memory 29 (a ROM). The expected parity-scan-results memory 29 stores the parity expected at the output of the arithmetic module 13, corresponding to each vector supplied from the vector memory 17. The comparator 28 compares the expected parity value with the observed parity value derived by the parity encoder 26 to obtain the parity-scan comparison value or parity-scan error signal and couples that value to the priority encoder 18.

The arithmetic module 14 has the following connections. The arithmetic module 14 derives its input from the output of the arithmetic module 13 and the output of the module 14 is coupled to the data input of the succeeding memory module 15. The arithmetic module 14 has an associated parity encoder 27, to which its output data is supplied. The arithmetic module 14 has no parity input connection to the prior arithmetic module 13. The output of encoder 27 is coupled to the parity input of memory module 15, and to an input of the comparator 28 for comparison against the stored expected parity scan from memory 29. The comparator 29 then produces a parity scan comparison value (or error signal) which is coupled to the appropriate input terminal of the priority encoder 18.

The FIG. 1 embodiment has illustrated all four possibilities of module interconnection in a pipeline processor. They include connection of a memory module to a memory module (11 to 12), connection of a memory module to an arithmetic module (12 to 13), connection of an arithmetic module to an arithmetic module (13 to 14), and connection of an arithmetic module to a memory module (14 to 15).

In summary, the priority encoder 18 has the true parity error results from the memory modules in a first sequence and the parity scan errors from the arithmetic modules in a second sequence. In the first sequence, the memory modules (11, 12, 15) which produce a "true parity" check are connected to priority encoder terminals in the order of connection of the module within the pipeline processor. The arithmetic modules 13, 14, which produce "parity scan" checks, are also connected to the priority encoder terminals in the order of their connections within the pipeline processor.

The parity encoders 19, 20, 22, 26, 27, 24 of FIG. 1 all operate on a similar principle and may be the same whenever the numbers of connections being examined are alike. An exemplary parity encoder is the "parity generator/checker" (74LS280, Texas Instruments). The parity encoder will indicate whether there is an odd or an even number of 1's at a plurality of input connections and it will produce an output indication of that number in the form of a "1" or a "0" respectively, depending on whether it is used to signal odd or even parity. Whenever the number of needed parity inputs exceeds the number available from a single parity generator/checker, a plurality of parity checkers may be used. The mode of interconnection of a plurality of parity checkers is indicated in connection with the explanation of the parity checker 41a, 41b, 41c shown in FIG. 3B. The comparators 21, 23 and 25 are exclusive OR gates (but may be exclusive NOR gates).

The priority encoder 18 is constituted of a number of standard integrated circuits (AMD2913) sufficient for 64 inputs. It is adapted to signal the occurrence of an error, e.g. an error level on any of its 64 position coded inputs (as will be explained in connection with the more detailed showing of FIG. 2) and also to provide the identify of the first module in the data stream at which an error appears. For purposes of achieving this performance, the most upstream module is assigned the highest number in the input sequence and the most downstream module in the data stream the lower number. Assuming a single fault in the most upstream module, which produces an error in its parity output, the output of the priority encoder will be $2^6 - 1$ (111111 binary). Each module is similarly identified by a numerical output corresponding to the module connection to the priority encoder.

The block diagram of FIG. 1 has been simplified for greater clarity in illustrating certain essential functions of the self-test controller. The highest order true parity errors and parity scan errors, treated as a single sequence for simplicity, are determined in the parity encoder 18, one test vector at a time. The process is conducted under the immediate control of the address counter 31 which selects which test vector of the regular, ($2^{10}$-vector) sequence is being supplied to the processor at any instant. The address counter 31 provides the RAM address at which each parity encoder output is to be stored. Thus, after the full sequence of test vectors has been run through the system, one has sufficient information to unambiguously locate the most upstream faulty module. The information collection stage of the operation is then terminated with the RAM 30 filled with the numbers of the highest order modules at which errors have occurred. The microcomputer 32 then searches through the RAM 30 for the largest number (single highest priority module) at which an error occurred during all the test vectors. That module is then replaced, and the test sequence re-instituted. When the off-line test sequence shows no errors, the pipeline self-test process is complete. (The controller, however, must still check itself.)

Figure 2:
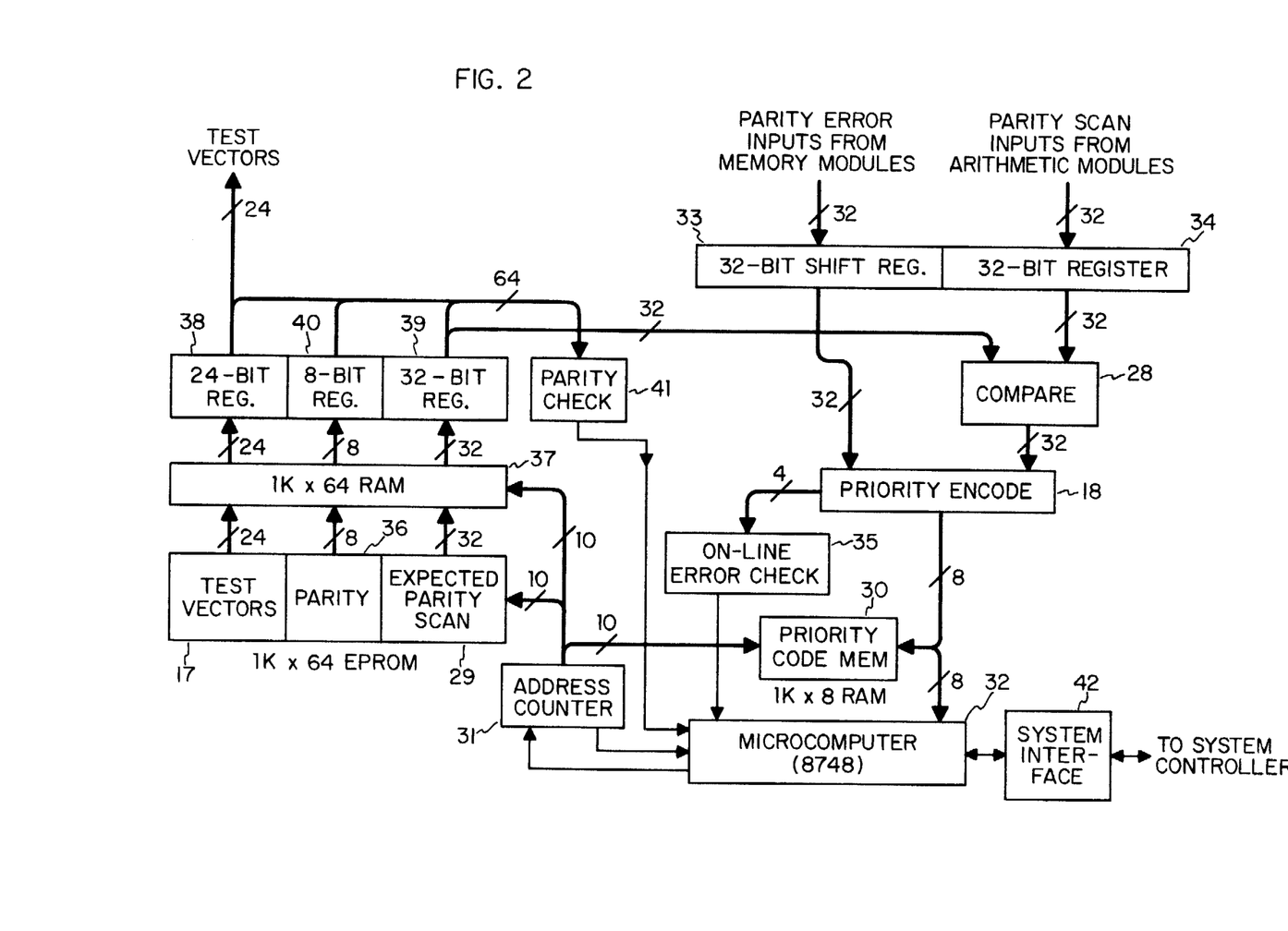
FIG. 2 is a more detailed block diagram of the control portions of the self-testing pipeline processor.

In FIG. 2, a more detailed description of the parity-scan test controller is provided together with an identification of exemplary blocks in its assembly. The pipeline processor subject to self-test has not been made a part of the FIG. 2 illustration. (In addition, the multiplexer 16 is not shown, nor are the parity encoders associated with each module of the pipeline processor, nor are the comparators associated with the memory modules.) The exemplary pipeline processor operates on 24 parallel bits of input data and may contain up to 32 memory modules and up to 32 arithemtic modules. The ratio of memory modules to arithmetic modules and the total may of course be changed.

In FIG. 2, the test controller may be seen to comprise the blocks 17, 18 and 28-32, previously illustrated in FIG. 1, to which the additional blocks 33-42 have been added. The true parity errors derived from the parity encoders associated with the memory modules are applied to the individual inputs of a 32 bit shift register 33. The parity scan errors derived from the parity encoders associated with the arithmetic modules are applied to the individual inputs of a second 32 bit register 34. The output of the shift register 33 is applied to the first 32 inputs of the priority encoder 18, while the output of the second 32 bit register 34 is applied to the comparator 28 whose output is coupled to the second 32 inputs of the priority encoder 18 (downstream of the connections to the memory modules). The priority encoder 18, in addition to ranking the highest output at which an error occurs, also has an output providing an indication of error during the on-line test. That indication is provided to the on-line error check block 35 whose output is also coupled to the microcomputer 32.

The foregoing blocks (33, 34, 28, 18, 35) are provided by conventional integrated circuits interconnected in a conventional manner. The 32 bit shift register 33, which is designed to operate at the 5 MHz clock rate of the pipeline processor, is constituted of eight 4 bit registers (74LS194, Texas Instruments), while the 32 bit register 34, which is designed to operate "off-line" at a 5 MHz clock rate, is constituted of four 8 bit registers (74LS374, Texas Instruments). The comparator 28 is constituted of eight 4 bit comparators (74LS86, Texas Instruments). The 64 input priority encoder 18 is formed of a first rank of eight parity encoders (AM2913, AMD, Inc.), each providing an output to a single second rank priority encoder (AM2913, AMD, Inc.). The output of the last encoder is supplied to the priority code memory 30. Each of the first rank of priority encoders, includes an 8 input NAND gate for signalling the presence of an error level at any one of its eight inputs. The 8 NAND gates are in turn coupled to the "on-line" error check 35. The 64 input priority encoder is connected as suggested on pages 3-199 to 3-203 in the "Advanced Micro Devices', Schottky and Low-Power Schottky Data Book Including Digital Signal Processing Handbook", 2nd Edition 1977. The "on-line" error check 35 is constituted of one 8 input NAND gate (74LS20, Texas Instruments) and a flip-flop (74LS74, Texas Instruments), whose output is coupled to the microcomputer 32 to flag the occurrence of an "on-line" error.

The generation of test vectors and a self-test feature for the test vector generators are seen to entail a 1K × 64 ROM comprising the blocks 17 and 29, previously illustrated, and a parity storage section 36, not previously illustrated, a 1K × 64 RAM 37 to which the output from the ROM 17, 29, 36 is applied and subjected to the control of the address counter 31. (The 1K mentioned above is in fact 1024, i.e. $2^{10}$). The three outputs of the RAM 37 (the test vectors, the expected parity scan values and parity) are applied to three registers 38, 39 and 40, respectively. The test vectors are then applied from the register 38 to the multiplexer 16 (illustrated in FIG. 1). The expected parity scan values are applied from the register 39 to the comparator 28 for use in testing the pipeline processor. The outputs from the registers 38, 39 and 40 are also collectively applied to the parity check block 41 to test proper operation in the generation of the test vectors and the parity scan values. The output of the parity check 41 is applied to the microcomputer 32.

Figure 3A:
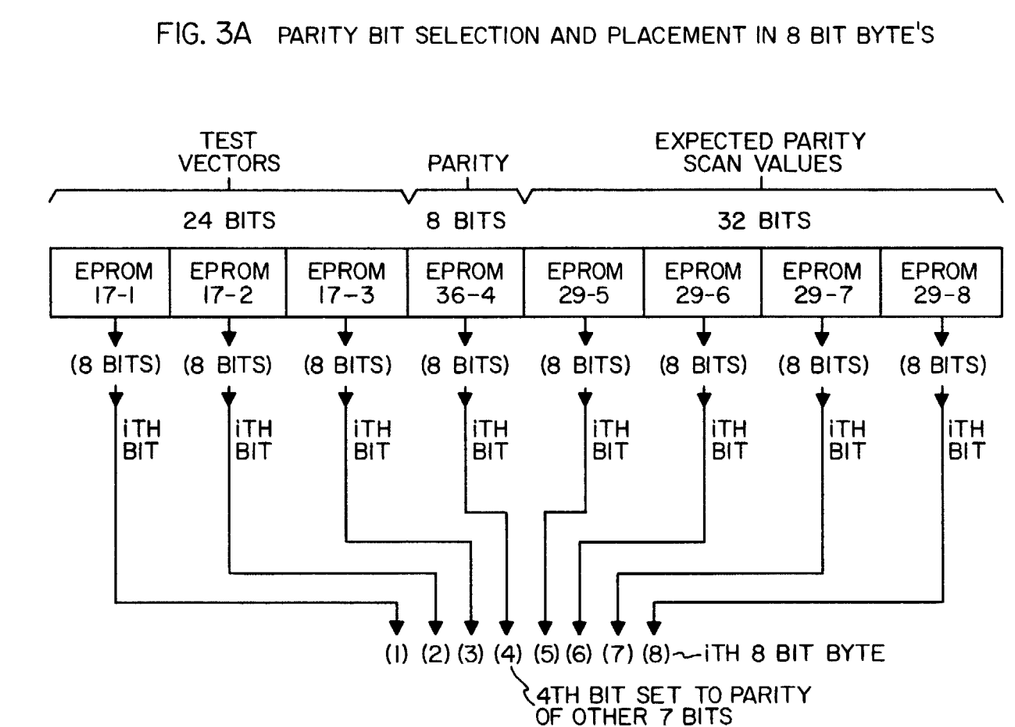
FIG. 3A illustrates the selection of the parity bit and its placement in the test data.
Figure 3B:
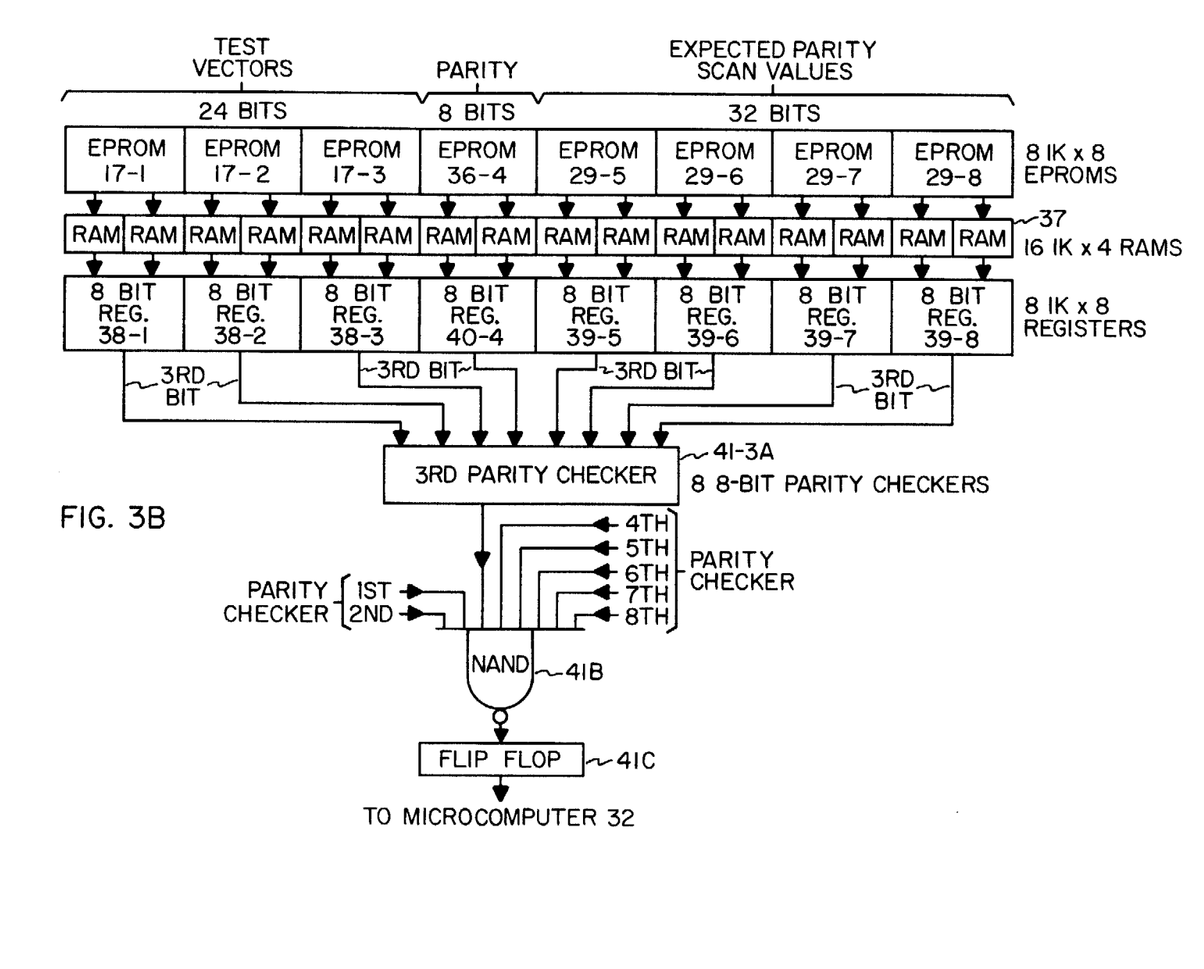
FIG. 3B illustrates the self-testing equipment producing the test data and a parity check of that portion of the self-test equipment.

The self-testing of the test vectors supplied from the ROM 17 and of the expected parity scan of the ROM 29 will now be treated in greater detail for purposes of illustrating a specific kind of parity check. The test vectors and expected parity scan values corresponding to each test vector are written into a 1K × 64 ROM as already noted. As shown in FIGS. 3A and 3B, the ROM is an electrically programmable ROM (EPROM) made up of eight (8) Intel-2758s, each having a 1K × 8 bit capacity. The test vectors are stored in three (17-1, 17-2, 17-3) of the 8 bit ROMs making up the block 17 and the expected parity scan values are stored in four of the 8 bit ROMs (29-5, 29-6, 29-7, 29-8).

The parity bits are selected and placed in 8 bit bytes in the following manner. There are eight parity bits assigned to each test vector and to the expected parity scan value corresponding to the test vector. As seen in FIG. 3A, the 24 bit test vector is subdivided into three 8 bit bytes arbitrarily numbered 1, 2 and 3 in an 8 number sequence. Similarly, the 32 bit expected parity scan values corresponding to the foregoing test vector are divided into four 8 bit bytes correspondingly numbered 5, 6, 7 and 8 in said 8 number sequence.

Each parity bit is determined in the following manner. The first parity bit is determined from the first bits of the three bytes of the test vector and the first bits of the four bytes of the parity scan values. The second parity bit is determined from the second bits of the three bytes of the test vector and the four bytes of the parity scan values. The third parity bit is determined from the third bits of the three bytes of the test vector and the four bytes of the parity scan values. The fourth parity bit is determined from the fourth bit of the seven bytes. The fifth parity bit is determined from the fifth bits of the seven bytes. The sixth parity bit is determined from the sixth bits; the seventh parity bit is determined from the seventh bits; and the eighth parity bit is determined from the eighth bits.

The eight bit parity bytes, determined in the above manner is then stored in the ROM indicated as 36-4 (FIGS. 3A, 3B). The ordering of the storage in the ROMs (17, 29, 36), as shown in FIG. 3B, is to place the test vectors in the first three 1K × 8 bit ROMs, parity in the fourth 1K × 8 bit ROM, and the expected parity scan values in the 5th, 6th, 7th and 8th 1K × 8 bit ROMs. The parity inserted into the ROM is used to check the operation of the RAM 37 and the registers 38, 39 and 40, which subsequently process the test vectors and the expected parity scan values. The distribution of a parity bit into every byte gives a check of substantially every state of the concerned ROM, RAM and registers.

The output of the ROM 17, 29, 36 (FIG. 2) is stored in the RAM 37 in the interest of greater speed in conducting the tests. The RAM 37 consists of 16 1K × 4 bit RAMS (TMS4045, Texas Instruments) of which six are assigned to the test vectors, two are assigned to parity and eight are assigned to the expected parity scan values. The data in the RAM 37 is then transferred under the control of the address counter 31 and microcomputer 32 to the three registers 38, 39 and 40 (FIG. 2). The registers collectively include 8 1K×8 bit registers (74LS273, Texas Instruments), of which the first three are allocated to the test vectors, the fourth is allocated to parity and the next four are allocated to expected parity scan values. The eight registers corresponding to the blocks 38, 39 and 40 provide a collective output to the parity check (FIG. 2, 41; FIG. 3B, 41 (1-8)A, 41B, 41C. Should an error occur, the parity check would signal an error to the microcomputer 32.

The parity check 41(1-8)A; 41B, 41C (FIG. 3B) consists of eight 8 bit parity checkers (41(1-8)A (74LS280, Texas Instruments), and an eight input NAND gate (74LS280, Tesas Instruments) 41B and a flip-flop 41C. The 8 bit bytes constituted of 3 bits of the test vector, 1 parity bit and 4 bits of expected parity are reconstituted at the input of each 8 bit parity checker 41(1-8), which accepts one 8 bit byte of this nature. The first parity checker accepts the first bit from all eight registers, the second parity checker accepts the second bit from all eight registers, and so on until all 8 bits have been provided for. Thus, 64 bits corresponding to the test vector, parity and the expcted parity scan for that test vector are checked. Assuming that no indication of error is obtained, the output of each parity checker will be a "one". The output of each of the eight parity checkers is then coupled to each of the eight inputs of an eight input NAND gate 41B, which is the next element of the parity check. Should no byte be in error, all the parity checkers would show a "1" and the NAND gate would provide a "0", indicating no error. If one byte is in error, the NAND gate would provide a "1", indicating an error. The error indication from 41B is provided via a flip-flop 41C to the microcomputer 32.

The self-testing of the pipeline processor is under the control of the controller. The self-testing includes testing of the pipeline processor itself, module be module, and self-testing of the components involved in the test. The operation takes place in three modes. The first mode occurs during on-line operation in which the memory modules of the pipeline processor are tested. The second mode is characterized as an off-line test that tests both memory modules and arithmetic modules of the pipeline processor, the operation of the test vector memory (17, 29) and the lower half of the priority encoder 18 assigned to the arithmetic modules. That process also partially checks the affected portions of the priority code memory 30 and the microcomputer 32. The third mode is a self-test mode performed on the microcomputer 32, the address counter 31, the priority code memory 30 and the upper half of the priority encoder assigned to the memory modules. An operational flow diagram of the test procedure is provided in FIG. 4.

Prior to a more detailed treatment of the controller operation, some additional generalized description of the system particulars and system operation may be in order.

The large number of signals (64 per processor clock) input to the controller is reduced to a manageable level by priority encoding which produces a unique signal for the highest failed module of a sequence. As earlier described, each module is assigned a priority according to the type (Memory higher than Arithmetic, Upstream higher than Downstream). Thus, the highest priority error is recorded when two or more occur simultaneously. (If no errors are reported, a unique code is also generated.)

Since the microcomputer 32 cannot handle the priority codes as fast as they are generated (at the 5 MHz clocking rate of the pipeline system), the priority codes are written into a RAM (30) which the microcomputer can access at its own lower speed (0.5 MHz). The priority codes are continuously overwritten unless the priority code memory RAM is disabled by the microcomputer. In other words, once in operation for a full set of test vectors, the memory will always retain the parity results for all $2^{10}$ vectors for all (64) modules. In a practical implementation, on-line (memory) testing may proceed as follows: Mission data is fed through the processor. Priority codes, indicating the source of an error signal, are then continuously written into the priority code memory. The microcomputer 32 monitors a flag (35) which is set whenever a priority code indicating a memory module error occurs. (Arithmetic module error codes are ignored since it is not known what parity scan values to expect.) If the on-line error flag is set, the microcomputer will disable the priority code memory 30, trapping the priority code which caused the error flag to be set together with the other priority codes filling the memory. The microcomputer then searches the memory 30 and determines which module caused the error.

The off-line (Arithmetic) test feeds a known set of test vectors through the processor. These test vectors, along with the expected parity scan values, are stored in PROM (17, 29). Since the PROM 17, 29 cannot run at the full speed of the system, the data is downloaded into RAM 37 by microcomputer command at the start of the off-line test. From RAM 37, the 2 test vectors are repeatedly fed into the pipeline processor a sufficient number of times to fill up the pipeline with test data. (This number of times is normally greater than 20 and less than 100.) As with the on-line test, priority codes are continuously written into the priority code memory 30. The priority scan values from the processor are automatically compared against the expected parity scan values and any noncompare results in an error signal to the priority encoder. After the pipeline processor has been filled with test data, the priority-code memory is disabled, capturing $2^{10}$ 8-bit codes. The microcomputer then searches the memory and determines the highest priority module (regardless of type) that generated an error, if any.

As earlier noted, the controller will also perform parity "self-testing" such as (1) parity checking of the test vectors and expected parity scan values, (2) a microcomputer self-test, (3) an address counter and priority code memory test, (4) a priority encoding test and (5) a parity scan comparator test. These self-tests provide an indication that the "tester" does not add significantly to the probability of failure of the processor.

Figure 4:
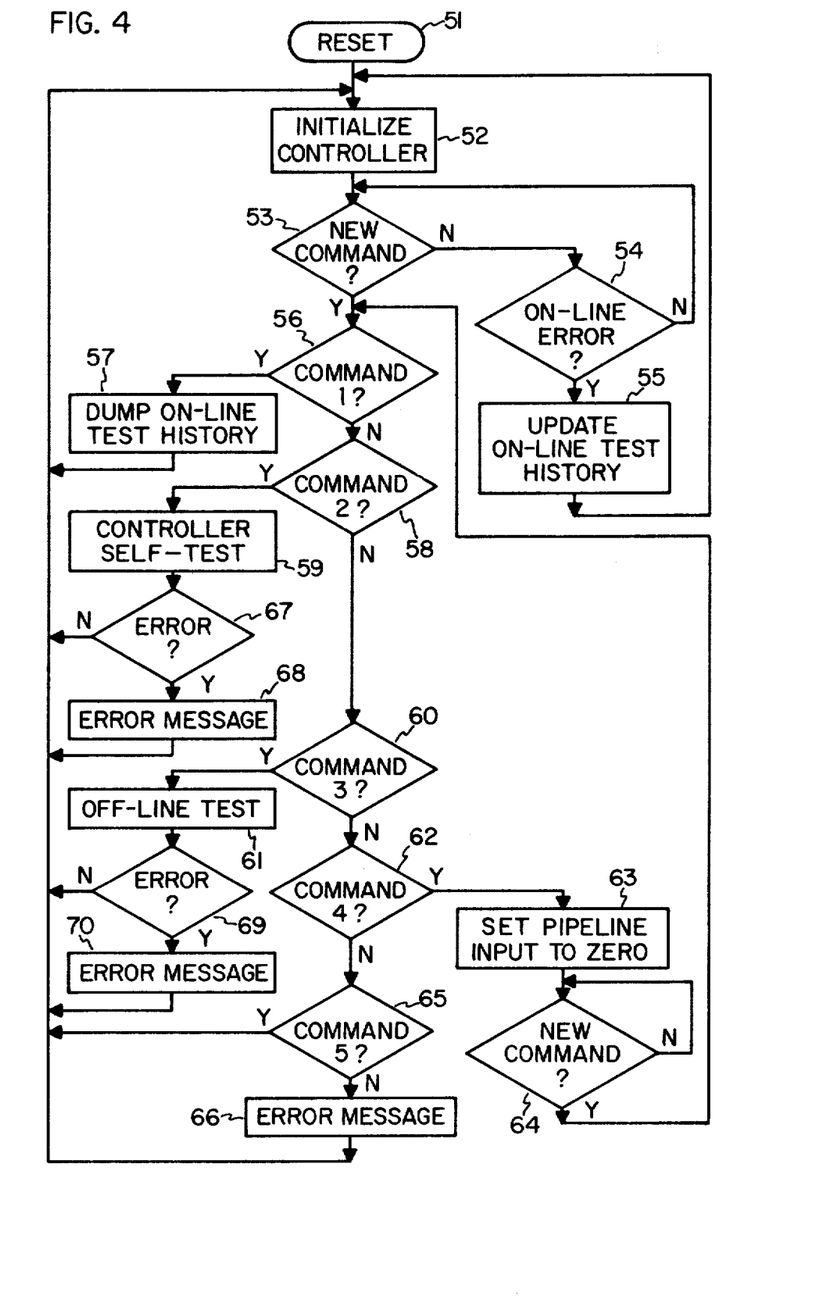
FIG. 4 is a flow diagram of the external command control of a substantially complete self-test in a self-testing pipeline processor in application of the principles herein disclosed.

The response of the parity-scan test controller to external commands is summarized in the flow diagram of FIG. 4. When the controller is reset (51), it initializes itself in order to resume on-line testing from the initial "address" from counter 31. It then goes into the on-line test mode in which the pipeline processor uses mission data. Other functions that are performed when "commanded" include "dump on-line history" (57), self-test controller (59), perform off-line test (61), clear processor (63), and resume on-line testing (52).

In the on-line test mode, priority encoded data is continuously written into the priority code memory 30.

Simultaneously, the microcomputer (32) monitors two inputs, one from the on-line error check (35) indicating that an on-line error has been detected and the other from the system interface 42 indicating that the system has issued a "new command" (53) to the controller. The two signals have equal priority. Service is on a first-come, first-serve basis.

If an on-line error is detected (54), the microcomputer 32 disables the writing of priority codes into the memory 30. This will trap the priority code which caused the on-line error "flag" to be set, since the response time of the microcomputer is much shorter than the time required to completely overwrite the memory for one set of test vectors. The microcomputer 32 then searches (55) the memory 30 for priority codes which indicate on-line (memory) error. The microcomputer 32 maintains a count of the number of times that each memory module in the system reported a parity error. Also maintained is a count of false alarms (on-line error flag set, but no error-indicating priority code found). At the conclusion of each memory search and on-line test history update (55), the test controller is re-initialized (52), and on-line testing resumes.

When any command is issued by the system (i.e. from 42), the controller first verifies the validity of the command, then executes it. A nonvalid command results in an error message to the system. The valid commands are the same as those listed for external requests.

The on-line test history (55) is output to the system controller. The thirty-first location in the internal microcomputer (32) RAM is output first, followed by locations 32 to 63. These correspond to the memory modules of the processor. The 33 bytes are output at 15 microsecond intervals. At the completion of this command, the controller resumes on-line testing.

The test controller checks itself partly with the processor on-line, but the testing is completed during the off-line test.

The first part of the controller self-test (59) is the microcomputer 32 self-test. First, the ALU within the microcomputer is checked. Next, the conditional branch logic of the microcomputer is checked. Then, the on-board RAM of the microcomputer is checked, a process which destroys the on-line test history. Finally, the ports to the microcomputer are checked by writing all patterns out to them.

If no errors are detected during the microcomputer self-test, the address counter 31 is checked next. The microcomputer monitors counter bit 10 while controlling the number of clock pulses delivered to the counter. Further testing of the counter 31 is achieved when checking the priority code RAM 30, which is next in the self-test sequence.

If no errors are detected during the address counter test, the priority code RAM 30 is tested. A counting pattern is written, read back, and compared. The pattern is shifted and the process repeated until all bit patterns are written into each location. The overall pattern guarantees that every location is actually addressed by the counter.

The first portion of the self-test sequence tests the portion of the priority encoding circuitry which encodes on-line errors. The shift register 33 at the priority encoder inputs is used to present inputs to the priority encoder 18 which should result in the encoding of each of the thirty-two possible priority codes for an on-line error. The microcomputer 32 monitors the resulting priority codes and verifies that they are correct. (The other half of the priority encoding circuitry is tested during the off-line test. The test vector and expected parity scan memory is also checked during the off-line test.)

At the completion of the controller self-test routine (59), the presence of an error is noted (67). If no error has occurred, the controller resumes on-line testing. Had an error occurred, an error message 68 is communicated via the microcomputer 32 to the system interface 42.

The first step in the off-line test (61) is the downloading of the 1 K of test vectors, expected parity scan values, and parity from the relatively slow EPROM 17, 29, 36 into the high speed RAM 37.

The input multiplexer is then switched to select the test vectors as the pipeline input. The processor operates on this input data for a period of time which is sufficient to clear the processor of unknown mission data. At this point, the microcomputer 32 disables the priority code RAM 30, trapping $2^{10}$ codes. The microcomputer 32 then checks the memory board's parity error check 35 to ensure that no errors have occurred while downholding the test vectors.

The first 960 bytes of the memory are searched for codes indicating errors. Both memory and arithmetic errors are checked, but only the highest priority error code is reported to the system.

If no error codes are found, the last 64 bytes of the priority code memory are checked. These are provided with artifical error codes designed to indicate errors to each of the arithmetic boards if the controller is working properly. The expected parity scan values are deliberately inverted to signify a false error in a pattern which checks each of the parity scan comparators and the half of the priority encoding circuitry not checked during self-test. If the expected error codes are not found, an error is reported to the system. The identifiable errors for both off-line self-test include the following:

PRIORITY ERROR CODE (OFF-LINE TEST Result) (Pipeline Processor modules 1, 2, 3, . . . 64)
NO ERRORS
ALU ERROR (in microcomputer 32)
BRANCH ERROR (in microcomputer 32)
RAM ERROR (in microcomputer 32)
PORT ERROR (in microcomputer 32)
COUNTER ERROR (31)
MEMORY ERROR (30)
PRIORITY ENCODE ERROR (memory modules) 1st half 18
PRIORITY ENCODE ERROR (arithmetic modules) 2nd half 18
MEMORY BOARD PARITY ERROR (test vector generator)

Again, at the end of the off-line test 61, the occurrence of an error is noted (69). If no error has occurred, on-line testing resumes. If an error has occurred, an error message is coupled via the microcomputer to the system interface 42.

The ability to clear the processor is included to aid in debugging the processor. The controller holds its output buffer clear and switches the processor's input multiplexer to that buffer. The input to the pipeline is then all zeros. The test controller does not check for any errors in this mode.

This state is maintained until another command is issued.

The resume on-line testing command is included merely to serve as a convenient way to terminate the clear processor command execution.

During both the on-line and off-line tests, priority encoded data is written into the priority code memory at the pipeline processor's operation speed (5 MHz).

In the on-line mode, the microcomputer directly disables the memory at some time after the on-line error flag has been set. This length of time is somewhat random, being determined by which instruction the microcomputer was executing when the on-line error flag was set. This response time is, however, guaranteed to be less than the time required to completely overwrite the memory, so that the error code corresponding to the on-line error flag being set is saved. The actual location of the error code in memory is not critical.

The foregoing description of the self-test procedure of a practical pipeline processor is designed to illustrate the substantially complete nature of the self-test operation including that of the "tester", i.e. those elements added to the pipeline processor for the self-test purpose.

An alternate mode of interconnection between memory modules is illustrated in FIG. 1A. In that illustration, memory modules 11 and 12, and the parity encoder 20 and comparator 21 associated with module 11, are shown. The data connections between the memory modules 11 and 12 aee as in FIG. 1. The parity input to the memory 12 is, however, not derived from the parity output of the memory 11. In other words, in the modification, parity of the input data of the memory module 11, after passage through the memory module, rather than the newly encoded parity of the output data of the memory module 11, is being transferred to the memory module 12. In this case, erroneous data with uncorrected parity value can pass to the next memory module and cause an error indication there as well as at the error source. The priority encoder will identify the most upstream erroneous memory module exactly as with parity-scan errors.

The present self-test system is both highly effective and of low cost in relation to the cost of the pipeline processor. The present self-test system permits the pipeline to be tested at full speed, while the self-test apparatus, once test results are obtained, may proceed to analyze the test data at a lower speed compatible with lower costs. The high speed permits most faults to be detected. In respect to costs, each memory module requires only the addition of a parity encoder and a comparator, which may be simple devices. Each non-deducible parity module also requires a parity encoder. The encoded parity values from the NDP modules are then supplied to comparators (one for each NDP module) in the central processor, which comparators accept the parity scan values from storage and supply outputs indicating the parity comparison values to the priority encoder 18, whose output is supplied to RAM 30. This process of parity checking permits a very substantial data reduction and permits the priority encoder 18 to operate at the 5MHz clock rate of the pipeline processor and the RAM to store the results at that clock rate. Once the information is in storage in the RAM 30, the off-line test continues at a low rate convenient to a low cost microcomputer.

The remaining self-test components in the central processor may also be simple. The microcomputer 32, which is used to search through the error codes stored in the memory, may now be a relatively low cost device. Typically, the microcomputer is adapted to search through the RAM at a 400 to 500 KHz rate.

The supply of test data in the central controller is also commensurate with a high performance, low cost approach. The test data is supplied at high speed (5MHz) of the pipeline processor but the elements involved are simple and may be self-checked (as shown earlier). The system design permits the use of an electrically programmable memory (EPROM 17, 29, 36) as the source of the test vectors, expected parity scan values, and parity. The EPROMs 17, 29, 36 are not ordinarily available for performance at the higher clock rates of the pipeline processor, but are available for lower rates. The advantage of the EPROMs is that they may be electrically programmed to accommodate system changes or improvements in the test vectors. In the present system, the slower EPROMs fill the RAM 37 and the registers 38, 39 and 40, which supply data at the higher (5MHz) clock rate of the processor.

What is claimed as new and desired to be secured by Letters Patent of the United States is:

1. A self-testing pipeline processor comprising:
   A. a plurality of concatenated deducible-parity (DP) modules processing data at a given clock rate,
      (1) each module having an input for data and an input for parity, the parity being that of the input data,
      (2) each module propagating said data and said parity in a common path to an output at which said data and said parity are separately available in performing the same function on said parity as that performed on said data,
      (3) a parity encoder associated with each module to which the module output data is applied for parity encoding, and
      (4) a comparator electrically associated with each module to which the input parity propagated in said module and the parity of the module output data are applied to form comparison values at said clock rate, each non-comparison being indicative of a possible fault in said module,
   B. a priority encoder having a plurality of priority ordered inputs and producing a malfunction code at said clock rate identifying the highest priority input at which each non-comparison is produced,
   the priority ordered encoder inputs being connected to the comparator outputs in the order of the associated modules' positions in the processor giving each module a unique priority code, the most upstream module having the highest priority code, and
   C. a memory means coupled to said priority encoder for storing the malfunction codes at said clock rate to identify the highest priority module associated with each error as a quantity of data is processed.

2. A self-testing pipeline processor comprising:
   A. a plurality of concatenated non-deducible-parity (NDP) modules processing data at a given clock rate,
      (1) each module having an input for data and an output for data, and each module propagating said data to said output while performing a predetermined function on said data,
      (2) a parity encoder associated with each module to which the module output data is applied for parity encoding,
      (3) a comparator electrically associated with each module to which expected parity and the parity of the module output data are applied to form comparison values at said clock rate, such non-comparison being indicative of a possible fault in said module, B. means for coupling test data to the data input of the initial module of said processor at said clock rate, said test data being designed to cause each module to produce output data having known parities, the test data being chosen so as to ensure a satisfactory probability of any malfunctioning module producing output data with erroneous parity, C. means for supplying the parity of the test data expected at each module output to one input of the associated comparator, D. a priority encoder having a plurality of priority ordered inputs and producing a malfunction code as said clock rate identifying the highest priority input at which each non-comparison is produced, the priority ordered encoder inputs being connected to the comparator outputs in the order of the associated modules' positions in the processor giving each module a unique priority code, the most upstream module having the highest priority code, and E. a memory means coupled to said priority encoder for storing the malfunction codes at said clock rate to identify the highest priority module associated with each error as a quantity of test data is processed.

3. A self-testing pipeline processor as set forth in claim 2 wherein a microprocessor is provided to search through the malfunction codes stored in said memory means for the highest priority module associated with an error.

4. A self-testing pipeline processor as set forth in claim 3 wherein said microprocessor searches said memory means at a slower rate than said given clock rate.

5. A self-testing pipeline processor comprising:

A. plurality of concatenated deducible-parity (DP) modules processing data at a given clock rate,
   (1) each DP module having an input for data and an input for parity, the parity being that of the input data,
   (2) each DP module propagating said data and said parity in a common path to an output at which said data and said parity are separately available, while performing the same function on said parity as that performed on said data,
   (3) a parity encoder associated with each DP module to which the DP module data is applied for parity encoding, and
   (4) a comparatory electrically associated with each DP module to which the input parity propagated in said DP module and the parity of the DP module output data are applied to form comparison values at said clock rate, each non-comparison being indicative of a possible fault in said DP module, B. a plurality of concatenated non-deducible parity (NDP) modules processing data at a given clock rate,
   (1) each NDP module having an input for data and an output for data, and each NDP module propagating said data to said output while performing a predetermined function on said data,
   (2) a parity encoder associated with each NDP module to which the NDP module output data is applied for parity encoding, a comparator electrically associated with each NDP module to which expected parity and the parity of the NDP module output data are applied to form comparison values at said clock rate, each non-comparison being indicative of a possible fault in said NDP module, C. means for coupling test data to the data input of the initial module (DP or NDP) of said processor at said clock rate, said test data being designed to cause each DP and NDP module to produce output data having known parities, the test data being chosen so as to ensure a satisfactory probability of any malfunctioning module producing output dat with erroneous parity, D. means for supplying the parity of the test data expected at each NDP module output to one input of the associated comparator, E. a priority encoder having a plurality of priority ordered inputs and producing as an output a malfunction code at said clock rate identifying the highest priority input at which each non-comparison is produced, the priority inputs being connected to the comparator outputs in the order of the associated modules' positions in the processor, with the comparators associated with DP modules having higher priority codes than all comparators associated with NDP modules, each DP or NDP module being given a unique priority code among like DP or NDP modules, the most upstream module having the highest priority code, and F. a memory means coupled to said priority encoder for storing the malfunction codes at said clock rate to identify the highest priority module (DP or NDP) associated with each error as a quantity of test data is processed.

6. A self-testing pipeline processor as set forth in claim 5 wherein a microprocessor is provided to search through the malfunction codes stored in said memory means for the highest priority module associated with an error.

7. A self-testing pipeline processor as set forth in claim 6 wherein said microprocessor searches said memory means at a slower rate than said given clock rate.

8. A self-testing pipeline processor as in claim 5 having means to provide an error message should any comparator associated with a DP or NDP module provide a non-comparison.

9. A self-testing pipeline processor as set forth in claim 6 having means for supplying test data to the data input of said initial module (DP or NDP) and expected parity to said comparators associated with NDP modules,
   (1) a first ROM memory in which test data is stored, for input to the self-testing pipeline processor,
   (2) a second ROM memory in which the parity of the test data expected at each NDP module output is stored, and
   (3) a third ROM memory in which the parity of said test data and said expected parity value is stored, A. a plurality of RAM memories into which said test data, expected parity, and parity of said test data and expected parity are transferred from said ROMS for access at said given clock rate, B. A plurality of registers for transferring test data from said RAM memories to said initial module, and expected parity to said comparators associated with NDP modules at said clock, and C. a parity checker to which said test data, said expected parity of the expected test data, and said parity of the actual test data and its expected parity are supplied for a check of said ROMS, RAMS and registers.

10. A self-testing pipeline processor as set forth in claim 9 wherein said first, second and third ROM memories are electrically programmable memories having a clock rate slower than said given clock rate, but matching that of said microprocessor.

* * * * *